(12) United States Patent
Ricci

(10) Patent No.: US 10,958,956 B2
(45) Date of Patent: Mar. 23, 2021

(54) METHOD AND SYSTEM FOR CUSTOMIZING TELEVISION CONTENT

(71) Applicant: Flextronics AP, LLC, San Jose, CA (US)

(72) Inventor: Christopher P. Ricci, Saratoga, CA (US)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 16/564,397

(22) Filed: Sep. 9, 2019

(65) Prior Publication Data

US 2020/0077130 A1    Mar. 5, 2020

Related U.S. Application Data

(60) Continuation of application No. 14/996,971, filed on Jan. 15, 2016, now abandoned, which is a division of
(Continued)

(51) Int. Cl.
| | | |
|---|---|---|
| H04N 21/258 | (2011.01) | |
| H04N 21/25 | (2011.01) | |
| H04N 21/441 | (2011.01) | |
| H04N 21/442 | (2011.01) | |
| H04N 21/237 | (2011.01) | |

(Continued)

(52) U.S. Cl.
CPC ..... *H04N 21/25875* (2013.01); *H04N 21/237* (2013.01); *H04N 21/251* (2013.01); *H04N 21/2541* (2013.01); *H04N 21/25891* (2013.01); *H04N 21/2668* (2013.01); *H04N 21/441* (2013.01); *H04N 21/44204* (2013.01); *H04N 21/44218* (2013.01); *H04N 21/4667* (2013.01); *H04N 21/4756* (2013.01); *H04N 21/4758* (2013.01)

(58) Field of Classification Search
CPC ......... H04N 21/25875; H04N 21/2541; H04N 21/4758; H04N 21/237; H04N 21/251; H04N 21/25891; H04N 21/2668; H04N 21/441; H04N 21/44218; H04N 21/4667; H04N 21/4756; H04N 21/44204
See application file for complete search history.

(56) References Cited

U.S. PATENT DOCUMENTS

| | | |
|---|---|---|
| 5,550,928 A | 8/1996 | Lu et al. |
| 6,637,029 B1 | 10/2003 | Maissel et al. |

(Continued)

FOREIGN PATENT DOCUMENTS

| | | |
|---|---|---|
| CN | 1736080 | 2/2006 |
| CN | 101313572 | 11/2008 |
| CN | 101513060 | 8/2009 |

OTHER PUBLICATIONS

International Search Report and Written Opinion for International (PCT) Patent Application No. PCT/US13/45890, dated Oct. 21, 2013 10 pages.

(Continued)

*Primary Examiner* — Benjamin R Bruckart
*Assistant Examiner* — Tien M Nguyen
(74) *Attorney, Agent, or Firm* — Sheridan Ross P.C.

(57) ABSTRACT

An intelligent television is provided that can collect viewer information for use by a rating service.

19 Claims, 10 Drawing Sheets

Related U.S. Application Data application No. 13/918,268, filed on Jun. 14, 2013, now Pat. No. 9,241,187.

(60) Provisional application No. 61/659,626, filed on Jun. 14, 2012.

(51) Int. Cl.
*H04N 21/2668* (2011.01)
*H04N 21/466* (2011.01)
*H04N 21/475* (2011.01)
*H04N 21/254* (2011.01)

(56) References Cited

U.S. PATENT DOCUMENTS

| | | | |
|---|---|---|---|
| 7,734,680 | B1 | 6/2010 | Kurapati et al. |
| 7,757,250 | B1 | 7/2010 | Horvitz et al. |
| 7,861,259 | B2 | 12/2010 | Barone |
| 9,241,187 | B2 | 1/2016 | Ricci |
| 2002/0053084 | A1 | 5/2002 | Escobar et al. |
| 2002/0056087 | A1 | 5/2002 | Berezowski et al. |
| 2002/0174430 | A1 | 11/2002 | Ellis et al. |
| 2003/0110252 | A1 | 6/2003 | Yang-Huffman |
| 2003/0110499 | A1 | 6/2003 | Knudson et al. |
| 2003/0126617 | A1 | 7/2003 | Tewari et al. |
| 2005/0132420 | A1 | 6/2005 | Howard et al. |
| 2005/0149964 | A1 | 7/2005 | Thomas et al. |
| 2007/0136753 | A1 | 6/2007 | Bovenshulte et al. |
| 2008/0092169 | A1* | 4/2008 | Shannon ............ H04N 21/4312 725/46 |
| 2009/0138805 | A1* | 5/2009 | Hildreth ............ H04N 21/4223 715/745 |
| 2009/0217324 | A1* | 8/2009 | Massimi ............ H04N 7/173 18 725/46 |
| 2010/0115060 | A1 | 5/2010 | Julia et al. |
| 2010/0146553 | A1 | 6/2010 | Lo et al. |
| 2010/0241699 | A1 | 9/2010 | Muthukumarasamy et al. |
| 2010/0299692 | A1 | 11/2010 | Rao et al. |
| 2010/0333032 | A1* | 12/2010 | Lau ............ H04N 5/44543 715/835 |
| 2011/0016482 | A1 | 1/2011 | Tidwell et al. |
| 2011/0007452 | A1 | 3/2011 | Shimy et al. |
| 2011/0072452 | A1* | 3/2011 | Shimy ............ H04N 21/4532 725/25 |
| 2012/0084801 | A1 | 4/2012 | Rowe et al. |
| 2013/0024290 | A1 | 1/2013 | Berg et al. |
| 2013/0278709 | A1 | 10/2013 | Mock |
| 2013/0312019 | A1 | 11/2013 | McMillan |
| 2015/0326941 | A1* | 11/2015 | Gao ............ H04N 21/4402 725/74 |
| 2016/0212464 | A1 | 7/2016 | Ricci |

OTHER PUBLICATIONS

International Preliminary Report on Patentability for International (PCT) Patent Application No. PCT/US2013/045890, dated Dec. 24, 2014 7 pages.
Official Action for Chinese Patent Application No. 201380029838. 7, dated Apr. 28, 2017, 5 pages.
Official Action for Chinese Patent Application No. 201380029838. 7, dated Nov. 3, 2017, 22 pages.
Notice of Grant (with English translation) for Chinese Patent Application No. 201380029838.7, dated Apr. 27, 2018), 5 pages.
Extended European Search Report for European Patent Application No. 13804559.6, dated Oct. 13, 2015, 7 pages.
Offical Action for European Patent Application No. 13804559.6, dated Nov. 30, 2017, 12 pages.
Official Action (Restriction Requirement) for U.S. Appl. No. 13/918,268, dated Oct. 22, 2013 7 pages.
Official Action for U.S. Appl. No. 13/918,268, dated Jan. 28, 2014 13 pages.
Official Action for U.S. Appl. No. 13/918,268, dated Aug. 7, 2014 23 pages.
Official Action for U.S. Appl. No. 13/918,268, dated Mar. 23, 2015 31 pages.
Notice of Allowance for U.S. Appl. No. 13/918,268, dated Sep. 10, 2015 22 pages.
Official Action (Restriction Requirement) for U.S. Appl. No. 14/996,971, dated Oct. 13, 2016 7 pages.
Official Action for U.S. Appl. No. 14/996,971, dated Feb. 23, 2017 9 pages.
Final Action for U.S. Appl. No. 14/996,971, dated Aug. 15, 2017 18 pages.
Official Action for U.S. Appl. No. 14/996,971, dated Feb. 26, 2018 24 pages.
Final Action for U.S. Appl. No. 14/996,971, dated Aug. 16, 2018 18 pages.
Official Action for U.S. Appl. No. 14/996,971, dated Dec. 13, 2018 18 pages.
Final Action for U.S. Appl. No. 14/996,971, dated May 9, 2019 22 pages.
Oral Hearing Summons for European Patent Application No. 13804559. 6, dated May 18, 2020 7 pages.
Decision to Refuse for European Patent Application No. 13804559. 6, dated Jul. 31, 2020 4 pages.

\* cited by examiner

METHOD AND SYSTEM FOR CUSTOMIZING TELEVISION CONTENT

CROSS REFERENCE TO RELATED APPLICATION

The present application is a continuation of and claims priority to U.S. patent application Ser. No. 14/996,971, filed Jan. 15, 2016, entitled "Method and System for Customizing Televised Content," which is a divisional of and claims priority to U.S. patent application Ser. No. 13/918,268, filed Jun. 14, 2013, entitled "Method and System for Customizing Televised Content," which claims the benefits of and priority, under 35 U.S.C. § 119(e), to U.S. Provisional Application Ser. No. 61/659,626, filed Jun. 14, 2012, entitled "Method and System for Customizing Televised Content," each of which is incorporated herein by reference in its entirety for all that it teaches and for all purposes.

BACKGROUND

Nielsen rating service is the penultimate service. Nielsen television ratings are gathered in one of two ways. First, it uses viewer "diaries", in which a target audience self-records its viewing or listening habits. By targeting various demographics, the assembled statistical models provide a rendering of the audiences of any given show, network, and programming hour. Second, it uses a more technologically sophisticated system known as set meters, which are small devices connected to televisions in selected homes. These devices gather the viewing habits of the home and transmit the information nightly to Nielsen through a "Home Unit" connected to a phone line. The technology-based home unit system is meant to allow market researchers to study television viewing habits on a minute-to-minute basis, seeing the exact moment viewers change channels or turn off their TV. In addition to set meters, individual viewer reporting devices, such as people meters, have allowed the company to separate household viewing information into various demographic groups, but so far Nielsen has refused to change its distribution of data of ethnic groups into subgroups, which could give more targeted information to networks and advertisers.

There is some public critique regarding accuracy and potential bias within Nielsen's rating system. Since viewers are aware of being part of the Nielsen sample, it can lead to response bias in recording and viewing habits. Audience counts gathered by the self-reporting diary methodology are sometimes higher than those gathered by the electronic meters which eliminate any response bias. This trend seems to be more common for news programming and popular prime time programming. Also, daytime viewing and late night viewing tend to be under-reported by the diary. Another criticism of the measuring system itself is that it fails the most important criterion of a sample: it is not random in the statistical sense of the word. A small fraction of the population is selected and only those that actually accept are used as the sample size. In many local areas of the 1990s, the difference between a rating that kept a show on the air and one that would cancel it was so small as to be statistically insignificant, and yet the show that just happened to get the higher rating would survive. And yet in 2009 of the 114,500,000 U.S. television households only 25,000 total American households (0.02183% of the total) participated in the Nielsen daily metered system. In addition, the Nielsen ratings one TV per household three perhaps four network model encouraged a strong push for demographic measurements. This caused problems with multiple TV households or households where viewers would enter the simpler codes (usually their child's) raising serious questions to the quality of the demographic data. The situation further deteriorated as the popularity of cable TV expanded the number of viewable networks to the point that the margin of error has increased due to the sampling sizes being too small. Compounding matters is the fact that of the sample data that is collected, advertisers will not pay for time shifted (recorded for replay at a different time) programs, rendering the 'raw' numbers useless. A related criticism of the Nielsen ratings system is its lack of a system for measuring television audiences in environments outside the home, such as college dormitories, transport terminals, bars, jails, and other public places where television is frequently viewed, often by large numbers of people in a common setting. In 2005, Nielsen announced plans to incorporate viewing by away-from-home college students into its sample. Internet TV viewing is another rapidly growing market for which Nielsen Ratings fail to account for viewer impact. Apple iTunes, atomfilms, Hulu, YouTube, and some of the networks' own websites (e.g., ABC.com, CBS.com) provide full-length web-based programming, either subscription-based or ad-supported. Though web sites can already track popularity of a site and the referring page, they can't track viewer demographics. To both track this and expand their market research offerings, Nielsen purchased NetRatings in 2007. However, noted in a February 2012 New York Times article the computer and mobile streams of a show are counted separately from the standard TV versions further degrading the over all quality of the sampling data. As a result there was no way for NBC to tell if there was any overlap between the roughly 111.3 million standard TV viewers and 2.1 million live stream viewers the Super Bowl. After Nielsen took over the contract for producing data on Irish advertising in 2009, agencies said that they were "disastrous" and claimed that the information produced by them is too inaccurate to be trusted by them or their clients.

SUMMARY

There is a need for a system to collect viewer information for use not only in determining viewer ratings for content but also in configuring Intelligent TV with intuitive user interfaces and with seamless user interaction capability and providing targeted advertisement and programming. These and other needs are addressed by the various aspects, embodiments, and/or configurations of the present disclosure. Also, while the disclosure is presented in terms of exemplary embodiments, it should be appreciated that individual aspects of the disclosure can be separately claimed.

A method, system (e.g., intelligent television, set-top box, set meter, home unit, and/or other electronically addressable network node (e.g., node having an electronic address)), and computer readable medium can be provided that:

collect viewer information regarding content provided to a viewer by the intelligent television and by one or more computational devices in communication with the intelligent television via a local area network and apply one or more rule sets to the collected viewer information to determine which of the collected viewer information is to be transmitted, over an untrusted network, to a remote destination for determining a rating and/or determining content to be provided to the viewer based, at least in part, on the collected viewer information.

The intelligent television can be one or more of a high-definition television, internet television, internet protocol television, smart television, satellite television, and web television, the remote destination can be associated with a rating service, the rating can be determined by an audience measurement algorithm, and the untrusted network can be the internet.

The viewer information can be time stamped information relating to one or more of television programming viewed by the viewer, media and/or multimedia content accessed from a content distributor by the viewer using the one or more computational devices, internet browsing history of the viewer, Web sites visited by the viewer, applications accessed and/or loaded by the viewer, frequency of application usage, numbers and types of the one or more computational devices, name of the viewer, a characteristic of the viewer, an interest of the viewer, and a socioeconomic status of the viewer.

The one or more computational devices can be one or more of a cellular phone (e.g., smart phone), tablet computer, laptop, personal computer, personal digital assistant, another television, and e-reader.

The one or more computational devices can be determined by a network discovery module. The one or more computational devices can be temporarily given access to the network, such as portable smart devices (e.g., smart phone, tablet computer, and the like) having access to a WiFi network. In this way, the users associated with the portable smart devices can be identified and relevant information about the users included in the collected viewer information. Even where privacy or other obstacles prevent user identification, the number of portable devices in wireless contact with the network within a specified spatial area and/or range of the intelligent television can be determined. Based on the assumption that one portable device corresponds to one viewer, a number of viewers of content can be determined for ratings analysis. This can be beneficial for identifying viewers in a group setting watching a television, such as college dormitories, transport terminals, bars, and other public places where television is frequently viewed, often by large numbers of people in a common setting, and private parties or gatherings.

The intelligent television can perform one or more Internet searches to determine viewer information. This can provide useful information, such as the demographics of the particular person watching currently provided content.

A microprocessor executable tagging module in the intelligent television, can tag the collected viewer information. The tags used in tagging can characterize, summarize and refer to a type and/or content of the collected viewer information associated with an assigned tag.

The applying step can be performed by a microprocessor executable filtration module in the intelligent television. The one or more rule sets can define what type of viewer information can be transmitted and applied to the collected viewer information using one or more tags assigned to the collected viewer information.

At least part of a purchase price paid by the viewer for the intelligent television and/or software executed by the intelligent television can be paid for by a rating service associated with the remote destination in exchange for access by the rating service to the collected viewer information.

A content distributor, based on the transmitted collected viewer information, can determine customized advertising to be presented to the viewer and/or programming to be provided to the viewer but not to at least one other concurrent viewer.

A method, system (e.g., intelligent television, set-top box, set meter, home unit, and/or other electronically addressable network node (e.g., node having an electronic address)), and computer readable medium can be provided that:

determines that a viewer has failed to comply with a contractual restriction and/or requirement previously agreed to by the viewer, the agreement being in exchange for a discounted price on an intelligent television and/or software; and at least partially disabling the intelligent television and/or software until the viewer complies with the at least one contractual restriction and/or requirement.

The determining step can be performed during provisioning of the intelligent television and/or software installation.

The determining step/operation can be based on records of a database. The records can indicate one or more of a serial number associated with the intelligent television and an identification of the viewer purchaser. The contractual restriction and/or requirement can require the viewer to provide a credential associated with one or more computational devices networked to the intelligent television and/or permission to collect viewer information from one or more of the intelligent television and one or more computational devices.

When the viewer has failed to comply with at least one contractual restriction and/or requirement previously agreed to by the viewer, a selected feature and/or operation of the intelligent television can be disabled while at least one other feature and/or operation can be enabled.

A method, system (e.g., intelligent television, set-top box, set meter, home unit, and/or other electronically addressable network node (e.g., node having an electronic address)), and computer readable medium can be provided that:

determines an identity of a viewer; and determines automatically based on the identity of the viewer one or more of a displayed configuration of one or more graphical identifiers presented to the viewer, which buttons and/or icons are presented to the viewer, which buttons and/or icons are not presented to the viewer, and a configuration of an on-screen directory containing programming and/or other content selectable by the viewer.

The viewer identity can be determined based on one or more of receipt of identification information from the viewer, from an image of the viewer (such as by facial recognition techniques), from a voice of the viewer (such as by voice recognition techniques), from a retinal scan of the viewer, by a fingerprint image received from the viewer, by biometrically sensing another physical characteristic of the viewer, and an identity of a computational device used to control one or more intelligent television features and/or operations.

A method, system, and computer readable medium can be provided that:

receives, at an input, plural sets of collected viewer information from multiple different households, the collected viewer information comprising tags and associated viewer information;

based on the tags, organizes, by a microprocessor, the associated viewer information; and applies, by the microprocessor to the organized viewer information, one or more audience measurement algorithms, to determine a popularity of selected content.

The viewer information from a selected household can be time stamped information relating to a plurality of television programming viewed by the viewer, media and/or multimedia content accessed from a content distributor by a viewer in the selected household other than a television network service, internet browsing history of the viewer, a Web site visited by the viewer, an application accessed and/or loaded by the viewer, a frequency of application usage, a number and/or type of one or more computational devices in the selected household, name of the viewer in the selected household, a characteristic of the viewer, an interest of the viewer, and a socioeconomic status of the viewer.

The one or more computational devices can include one or more of a cellular phone, tablet computer, laptop, personal computer, personal digital assistant, another television, and e-reader.

The method, system, and computer readable medium can further remove, by the microprocessor, duplicated viewer information, the duplicated viewer information being associated with a common household.

The popularity can be a rating.

The organizing step/operation can include identifying and grouping, for common content, different modalities of viewing the content.

The present disclosure can provide a number of advantages depending on the particular aspect, embodiment, and/or configuration. The system of the present disclosure can provide accuracy and avoid potential bias within Nielsen's rating system. Although viewers are aware of being part of a rating sample, they work in cooperation with the ratings provider to collect reliable viewing information, thereby eliminating response bias in recording and viewing habits. Due to the automated collection of information regarding viewer behavior, it can provide more reliable audience counts, even for news programming and popular prime time programming and for daytime viewing and late night viewing. The sample population can be larger than conventional ratings systems, thereby enabling a more statistically random sample. More viewers will willingly participate in the ratings system due to price reductions for televisions. Through the collection of more accurate information regarding viewer behavior, the system can provide more accurate ratings. This can be used more effectively to keep more popular programming on the air. In many cases, the difference between a rating that keeps a show on the air and one that would cancel it is so small as to be statistically insignificant. The system can collect viewing information for all televisions in the household rather than only one selected television. Automatic viewer detection can avoid problems with multiple TV households or households where viewers would enter the simpler codes (usually their child's) raising serious questions to the quality of the demographic data. The system can track viewer behavior accurately not only for network but also for cable and satellite programming. This can avoid problems with the currently large numbers of viewable networks and an increased margin of error due to the sampling sizes being too small. The system can account for viewer behavior for viewing delayed programming, such as time shifted (recorded for replay at a different time) programs, accurately to provide advertisers with more accurate indications of what programming is not time shifted. Through the collection of cellular phone identification information, the system can identify viewers even for television audiences in environments outside the home, such as college dormitories, transport terminals, bars, and other public places where television is frequently viewed, often by large numbers of people in a common setting. The system can track Internet TV viewing such as Apple iTunes, atomfilms, Hulu, YouTube, and some of the networks' own websites (e.g., ABC.com, CBS.com), which provide full-length web-based programming, either subscription-based or ad-supported. In these settings, the system can track both popularity of a site and the referring page and viewer demographics. It can also track computer and mobile streams of a show together further improving the overall quality of the sampling data. As a result, viewer overlap can be identified for programming viewed both by television and streaming.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "audience measurement" refers to the measurement of how many people are in an audience, usually in relation to radio listenership and television viewership, but also in relation to newspaper and magazine readership and, increasingly, web traffic on websites. Sometimes, the term is used as pertaining to practices which help broadcasters and advertisers determine who is listening rather than just how many people are listening. In some parts of the world, the resulting relative numbers are referred to as audience share, while in other places the broader term market share is used.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "content distributor" refers to a service provider that provides media and multimedia content to a display device, such as a television, laptop, personal computer, smart phone, tablet computer, and the like. Examples of content include television programming, advertisements, streaming media and multimedia, Web pages, documents, media and multimedia messages, and other electronic media. Examples of content distributors include Web sites, television stations, network operators, and aggregators.

The term "content provider" refers to a service provider that provides media and multimedia content to a television, such as local network television stations affiliates, cable television providers, telcos, terrestrial and satellite TV providers. A content provider is a type of content distributor. Examples of content providers include ABC™, NBC™ CBS™, Fox™ Comcast™, and DirectTV™.

The terms "determine," "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "enhanced television" refers to a collection of specifications developed under the project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080p–1920×1080p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777,600 pixels (approximately 0.8 megapixels) per field or 1,555,200 pixels (approximately 1.6 megapixels) per frame), or 720p–1280×720p: 921,600 pixels (approximately 0.9 megapixels) per frame. As will be appreciated, "frame size" in pixels is defined as number of horizontal pixels× number of vertical pixels, for example 1280×720 or 1920× 1080. Often the number of horizontal pixels is implied from context and is omitted, as in the case of 720p and 1080p, "scanning system" is identified with the letter "p" for progressive scanning or "I" for interlaced scanning, and "frame rate" is identified as number of video frames per second. For interlaced systems an alternative form of specifying number of fields per second is often used. For purposes of this disclosure, high-definition television" is deemed to include other high-definition analog or digital video formats, including ultra high definition television.

The term "internet search engine" refers to a web search engine designed to search for information on the World Wide Web and FTP servers. The search results are generally presented in a list of results often referred to as SERPS, or "search engine results pages". The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The term "internet television" (otherwise known as Internet TV, Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTE Player in Ireland; BBC iPlayer, 4oD, ITV Player (also STV Player and UTV Player) and Demand Five in the United Kingdom; Hulu in the United States; Nederland 24 in the Netherlands; ABC iview and Australia Live TV in Australia; Tivibu in Turkey; iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video on demand (VOD): browse a catalog of videos, not related to TV programming. IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment.

The term "Live TV," as used herein, refers to a television production broadcast in real-time, as events happen, in the present.

The term "means," as used herein, shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "media" of "multimedia," as used herein, refers to content that may assume one of a combination of different content forms. Multimedia can include one or more of, but is not limited to, text, audio, still images, animation, video, or interactivity content forms.

The term "module," as used herein, refers to any known or later developed hardware, software, firmware, artificial intelligence, fuzzy logic, or combination of hardware and software that is capable of performing the functionality associated with that element.

A "rating service" is an entity that uses an audience measurement system to determine audience size and/or composition of content. An example of a rating service is Nielsen.

The term "remote control" refers to a component of an electronics device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communications satellite and received by an outdoor antenna, usually a parabolic reflector generally referred to as a satellite dish, and as far as household usage is concerned, a satellite receiver either in the form of an external set-top box or a satellite tuner module built into a TV set.

A "smart TV", sometimes referred to as connected TV or hybrid TV, (not to be confused with IPTV, Internet TV, or with Web TV), describes a trend of integration of the Internet and Web 2.0 features into television sets and set-top boxes, as well as the technological convergence between computers and these television sets/set-top boxes. The devices have a higher focus on online interactive media, Internet TV, over-the-top content, as well as on-demand streaming media, and less focus on traditional broadcast media than traditional television sets and set-top boxes.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "standard-definition television" (SDTV) is a television system that uses a resolution that is not considered to be either high-definition television (HDTV 720p and 1080p) or enhanced-definition television (EDTV 480p). The two common SDTV signal types are 576i, with 576 interlaced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC and ISDB. Television signals are transmitted in digital form, and their pixels have a rectangular shape, as opposed to square pixels that are used in modern computer monitors and modern implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "video on demand (VOD)," as used herein, refers to systems and processes which allow users to select and watch/listen to video or audio content on demand. VOD systems may stream content, to view the content in real time, or download the content to a storage medium for viewing at a later time.

The term "web television" is original television content produced for broadcast via the World Wide Web. Some major distributors of web television are YouTube, Myspace, Newgrounds, Blip.tv, and Crackle.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

Figure 1A:
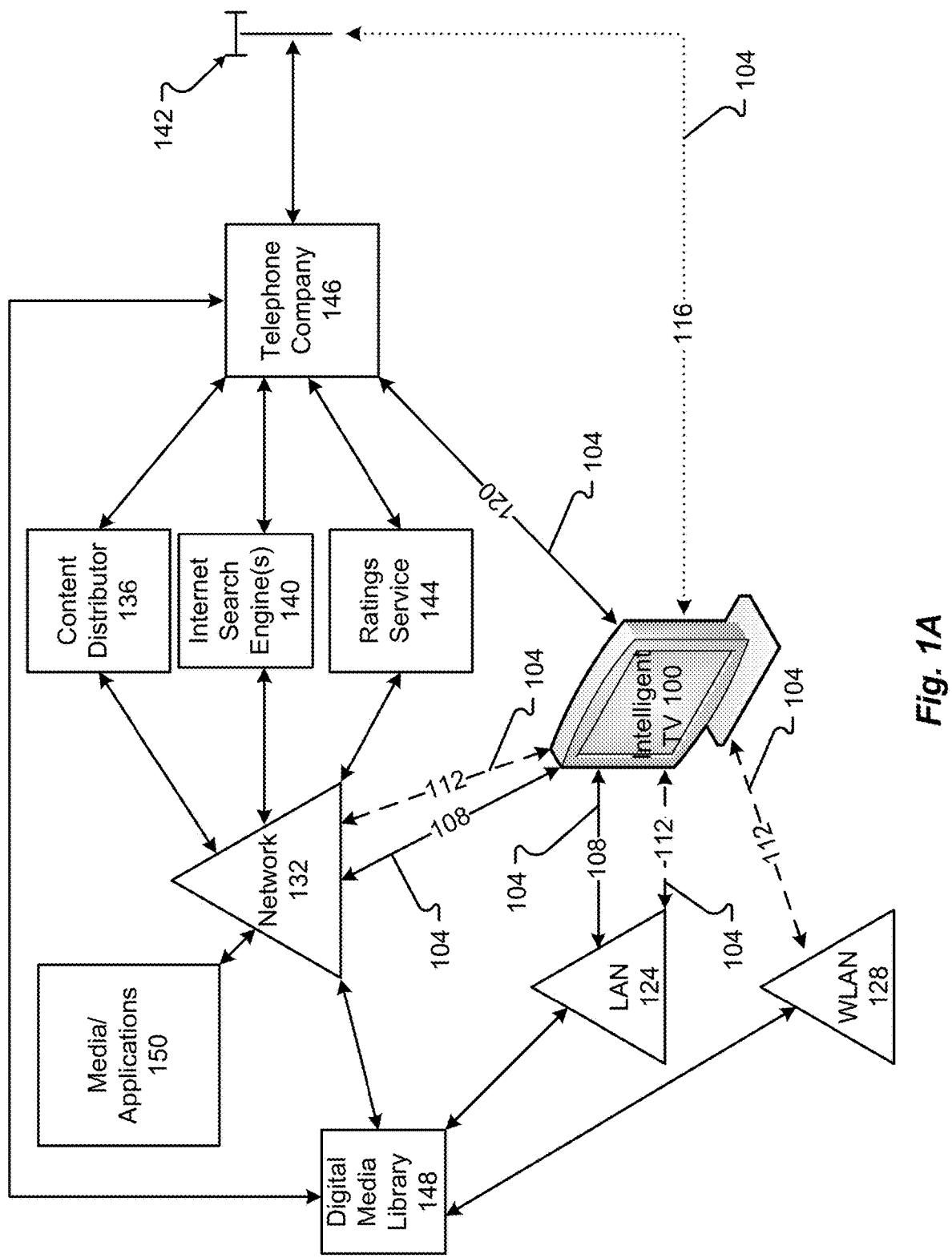
FIG. 1A includes a first view of an embodiment of an environment or a intelligent television.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a system for collecting viewer information regarding viewer behavior and context. The system can use the collected viewer information for various purposes, including determining viewer ratings for programming, viewer characteristics for providing customized programming and targeted advertising, configuring the viewer's programming interface on a television, and the like. While the disclosure is described with reference to an intelligent TV, it is to be understood that one or more of the functions and/or operations described herein with reference to the intelligent TV can be performed by another type of computational component, such as a set-top box, set meter, home unit, and/or other electronically addressable network node (e.g., node having an electronic address).

An intelligent TV is a network-enabled television that, when connected to a receiver of a content provider and/or local network of the user/viewer, can see everything the user/viewer does, thereby providing a better rating service than Nielsen and other rating companies currently possess. Even when connected to the Internet and not, via a wireless access point or other wireless or wireline connection, to other components in the local network, the intelligent TV can nonetheless collect viewer information, such as Internet searches done through the intelligent TV and programming and other content received by the intelligent TV. The intelligent TV provider and/or rating service can partially or fully subsidize the TV purchase price in exchange for permission to collect certain types of viewer information. The viewer information can be program viewing history, behavior, patterns, and content and Internet browsing behavior, particularly when the TV has Internet browsing capability. The viewer information can be collected and transmitted to the rating service over the Internet.

Further, if a wireless access point were to be included the computer in the intelligent TV, the computer can determine what users and computational devices are doing in the LAN. "Other devices" are any device accessible through the Internet or the LAN in the home. Such devices include cell phones, tablet computers, laptops, PC's, PDA's, e-readers, and the like. The TV could interact with WAPs, local (wireless) routers, and other network infrastructure. This would include viewing Internet browsing behavior, inter-party communications, and the like.

Such information would enable party-specific, or targeted, advertising and other information to be pushed over the intelligent TV to each home rather than common advertising to all homes. In other words, within a given geographical region or station broadcast area or set of viewers different viewers of the same programming content would receive customized or tailored advertising content based on monitored user characteristics/behavior/collected information. This concept can be expanded to computers generally when video programming is being viewed. The browsing history of the user could be used to push or pull customized advertising content to the user.

Figure 1B:
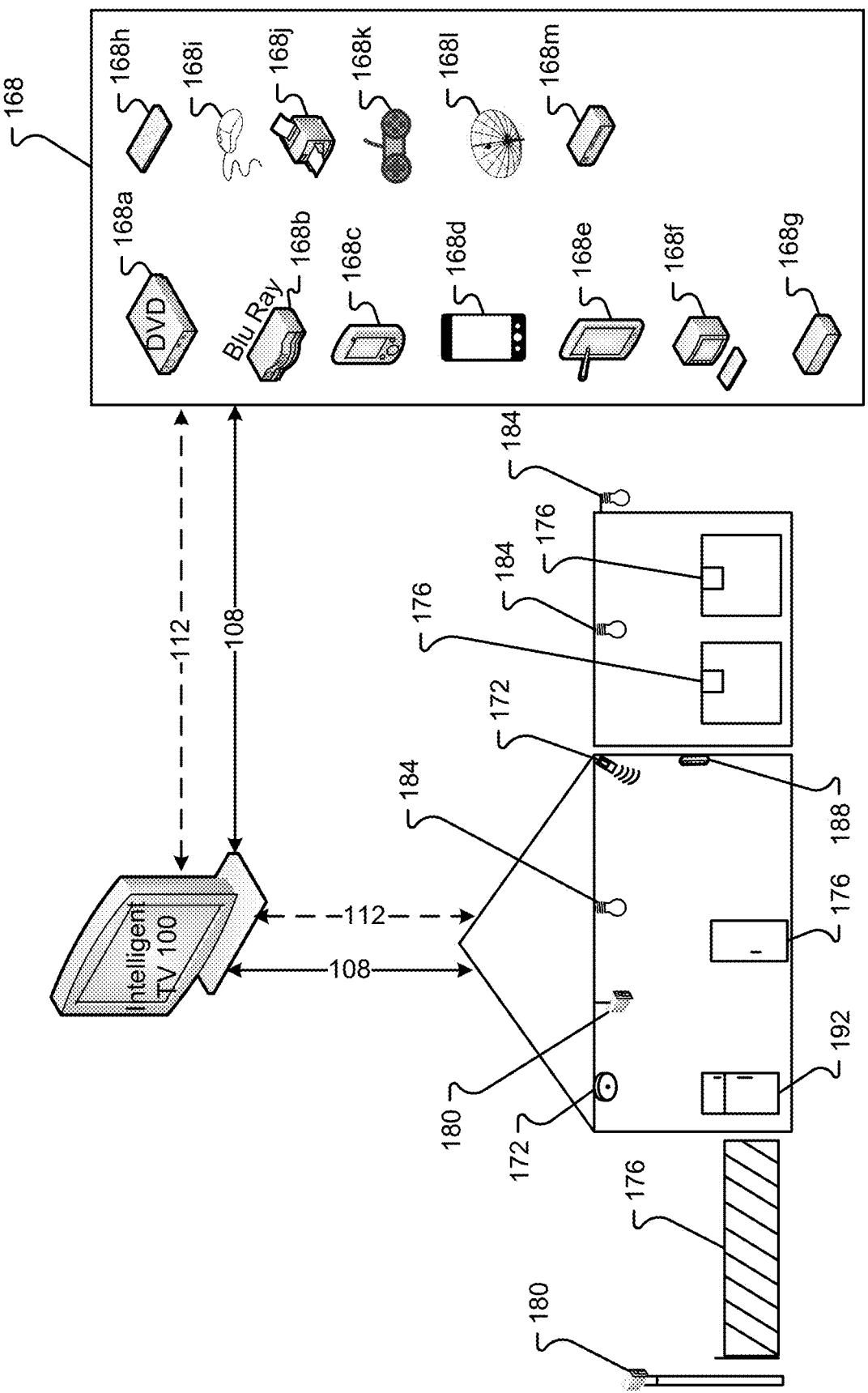
FIG. 1B includes a second view of an embodiment of an environment or a intelligent television.

Intelligent Television (TV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include the one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, netbooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

The Intelligent TV 100 may also be a communications device which can establish network connections 104 through many alternate means, including wired 108 or wireless 112 means, over cellular networks 116 to connect via cellular base antenna 142 to telephone networks operated by telephone company 146, and by using a telephone line 120 to connect to telephone networks operated by telephone company 146. These connections 104 enable the Intelligent TV 100 to access one or more communication networks. The communication networks may comprise any type of known communication medium or collection of communication media and may use any type of protocols to transport messages or signals between endpoints. The communication networks may include wired and/or wireless communication technologies. The Internet is an example of the communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks may be connected in a redundant manner to ensure network access. In other words, if one connection is interrupted, the intelligent TV 100 can use an alternate communications path to reestablish and/or maintain the network connection 104. Among other things, the intelligent TV 100 may use these network connections 104 to send to and receive information from one or more of a content distributor 136, Internet search engine(s) 140, ratings service 144, and other networked entities, such as DVD players 168*a*, BluRay players 168*b*, portable digital media devices 168*c*, smart phones 168*d*, tablet devices 168*e*, personal computers 168*f*, external cable boxes 168*g*, keyboards 168*h*, pointing devices 168*i*, printers 168*j*, game controllers and/or game pads 168*k*, satellite dishes 168*l*, external display devices 168*m*, and other universal serial bus (USB), local area network (LAN), Bluetooth™ high-definition multimedia interface (HDMI) compliant devices, and/or wireless devices and/or access remotely stored digital media libraries 148. In addition, these connections can allow the Intelligent TV 100 to surf the Internet using an Internet search engine 140, receive programming content, receive targeted advertising content, and collect viewer information.

Further, as shown in FIG. 1B, the intelligent TV 100 can interact with other electronic devices 168 by either by the wired 108 and/or wireless 112 connections. As described herein, components of the Intelligent TV 100 allow the device 100 to be connected to devices 168 including, but not limited to, DVD players 168*a*, BluRay players 168*b*, portable digital media devices 168*c*, smart phones 168*d*, tablet devices 168*e*, personal computers 168*f*, external cable boxes 168*g*, keyboards 168*h*, pointing devices 168*i*, printers 168*j*, game controllers and/or game pads 168*k*, satellite dishes 168*l*, external display devices 168*m*, and other universal serial bus (USB), local area network (LAN), WiFi™, Bluetooth™, high-definition multimedia interface (HDMI) compliant devices, and/or wireless devices. When connected to an external cable box 168*g* or satellite dish 168*l*, the Intelligent TV 100 can access additional media content. Also, as further described below, the Intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television.

Figure 3:
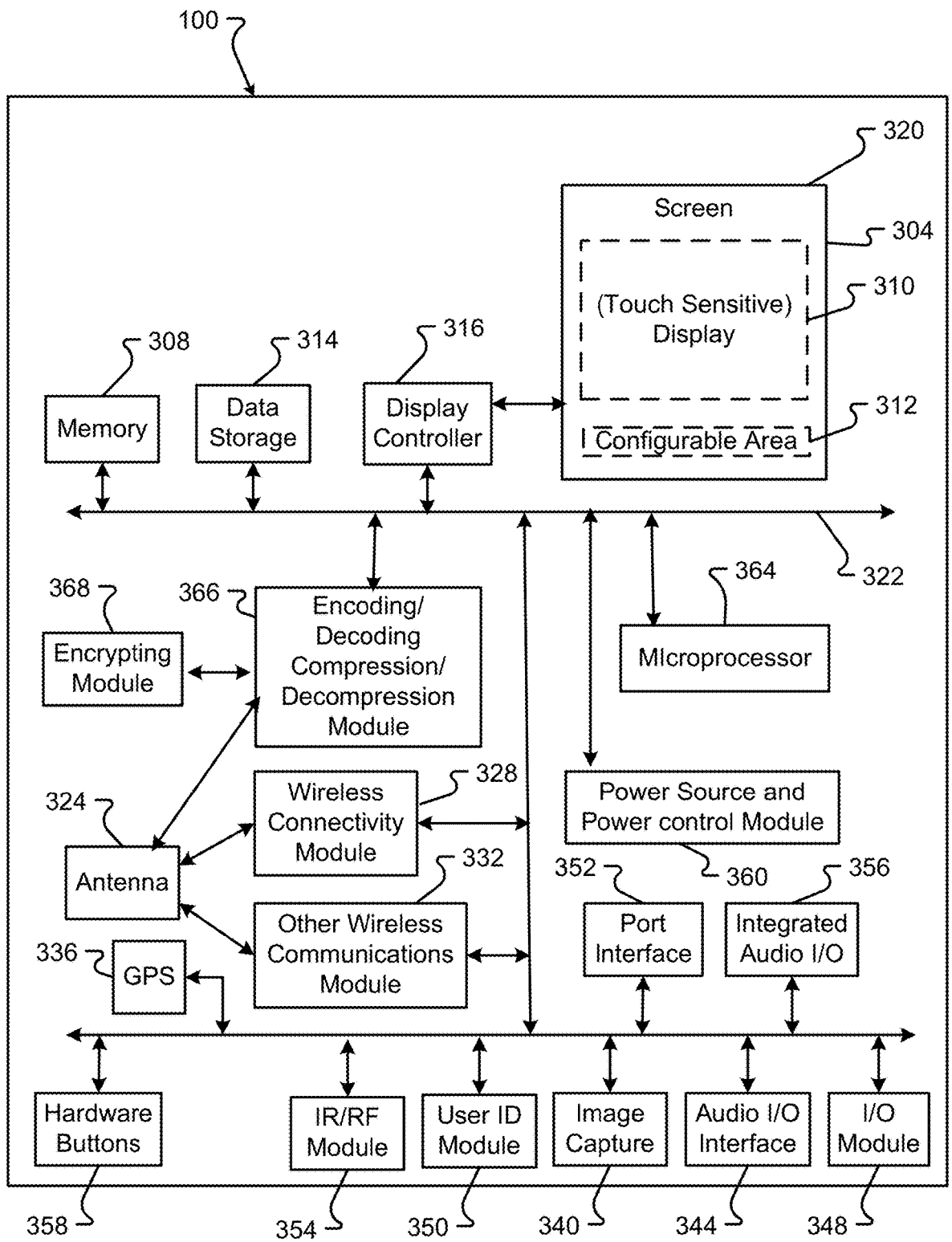
FIG. 3 is a block diagram of an embodiment of the hardware of the intelligent television.

Intelligent TV:

FIG. 3 illustrates components of a Intelligent TV 100 in accordance with embodiments of the present disclosure. In general, the Intelligent TV 100 includes a primary screen 304. Screen 304 can be a touch sensitive screen and can include different operative areas.

For example, a first operative region of the screen 304, may comprise a touch sensitive display 310. In general, the display 310 may comprise a full color, display.

A second area within the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated. As discussed below, the configurable area 312 may be configured by a user to reflect his or her unique preferences. Accordingly, within a common household multiple viewers can each have a different corresponding configurable area 312 reflecting each viewers unique preferences.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a microprocessor 364.

The microprocessor 364 may comprise a general purpose programmable processor or controller for executing application programming or instructions. In accordance with at least some embodiments, the microprocessor 364 may include multiple processor cores, and/or implement multiple virtual processors. In accordance with still other embodiments, the microprocessor 364 may include multiple physical processors. As a particular example, the microprocessor 364 may comprise a specially configured application specific integrated circuit (ASIC) or other integrated circuit, a digital signal processor, a controller, a hardwired electronic or logic circuit, a programmable logic device or gate array, a special purpose computer, or the like. The microprocessor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 368 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA and/or analog cellular telephony transceiver capable of supporting voice, multimedia and/or data transfers over a cellular network. Alternatively or in addition, the Intelligent TV 100 can include an additional or other wireless communications module 332. As examples, the other wireless communications module 332 can comprise a Wi-Fi, Bluetooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the microprocessor 364, and for the temporary or long term storage of program instructions and/or data. As examples, the memory 308 may comprise RAM, DRAM, SDRAM, or other solid state memory or computer readable medium. Alternatively or in addition, data storage 314 may be provided. Like the memory 308, the data storage 314 may comprise a solid state memory device or devices. Alternatively or in addition, the data storage 314 may comprise a hard disk drive or other random access memory.

Hardware buttons 358 can be included for example for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC to DC converter, power control logic, and/or ports for interconnecting the Intelligent TV 100 to an external source of power.

Communication between components of the Intelligent TV 100 is provided by bus 322. Bus 322 may comprise one or more physical buses for control, addressing, and/or data transmission. Bus 322 may be parallel, serial, a hybrid thereof, or other technology.

Figure 2:
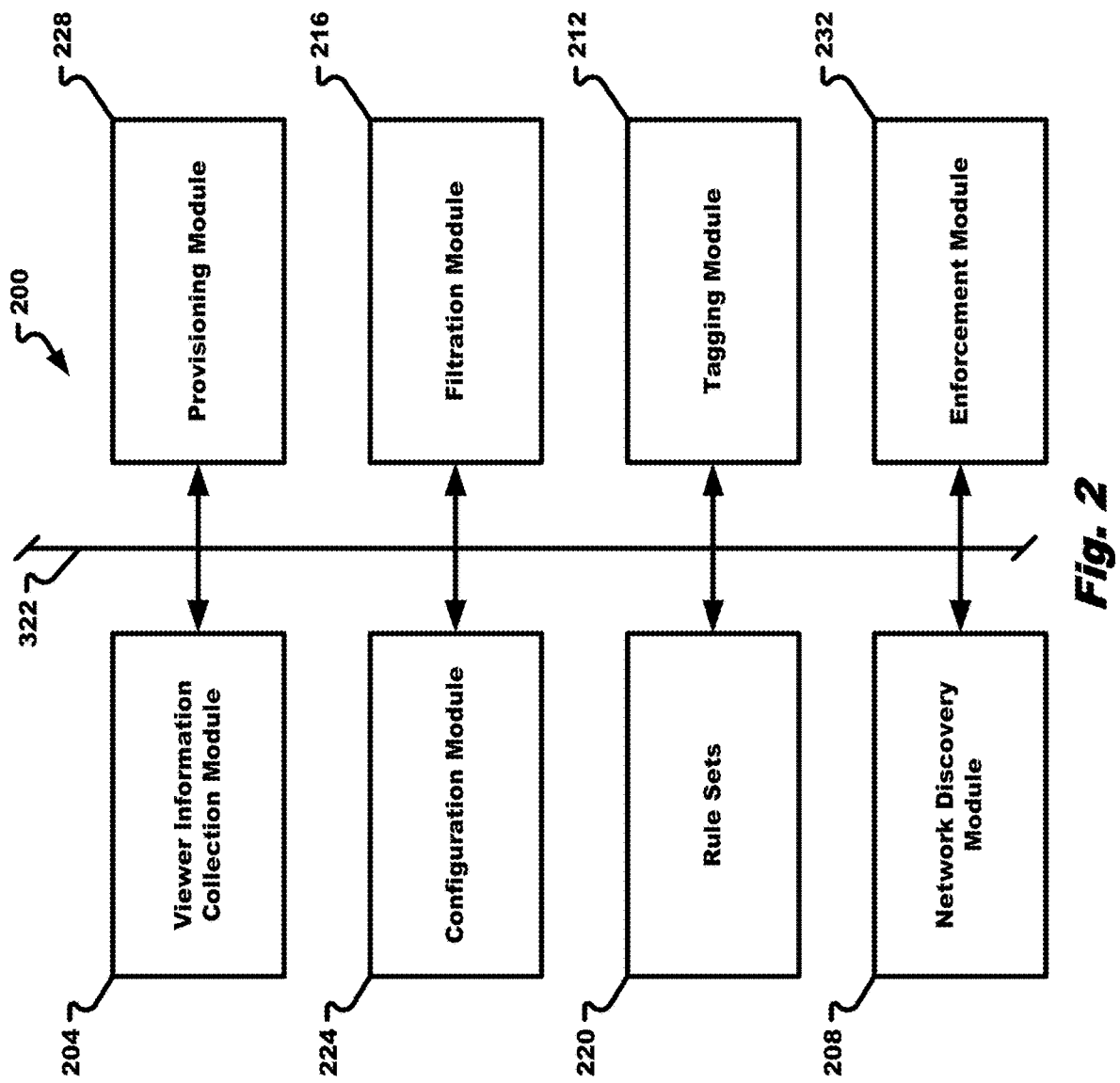
FIG. 2 is a block diagram depicting certain computational modules of an embodiment of a intelligent television.

Firmware and Software:

An embodiment of selected software system components and modules 200 is shown in FIG. 2.

A viewer information collection module 204 collects predetermined types of viewer information regarding viewer behavior and context. Viewer information commonly includes timestamped information regarding usage of one or more devices 168, such as media and multimedia content accessed by the one or more devices, Web sites visited by the viewer, Internet searches performed by the viewer, applications accessed and/or loaded by the viewer and the frequency of application access, and other information of interest to a ratings service 144, numbers and types (e.g., make, model, and device type) of devices 168 in the viewer's local area network or otherwise associated with the viewer, names of viewers within the household, characteristics of viewers within the household (e.g., age, sex, ethnicity, etc.), physical location of household (which can be determined by user input and/or by the GPS receiver 336), names of viewers within a desired spatial range or area of the intelligent television, characteristics of the identified viewers within the defined spatial range or area (e.g., age, sex, ethnicity, etc.), physical location of intelligent television (which can be determined by user input and/or by the GPS receiver 336), hobbies and other interests of the viewers, status and type of viewer employment (e.g., job title, employer, etc.), socioeconomic status of the viewers and/or household, parties to (e.g., electronic addresses identified in) and/or content of inter-party communications, and other information of interest to a ratings service 144. The viewer information can be collected by searching the Internet via Internet search engine(s) for information about each viewer (including searching social networks and other Web sites), accessing digital media library 148, accessing media/applications 150, monitoring content provided by a content distributor 136 to the intelligent TV 100 and/or devices 168, monitoring Internet searches by the intelligent TV 100 and/or devices 168, and the like.

The network discovery module 208 is conventional and discovers the network topology of the LAN 124, WLAN 128, and/or network 132. Network discovery gathers information about devices on a network. Network topology includes typically a listing of the types of devices, status, IP addresses, and other topology information. For example, the Microsoft Computer Browser service can perform network discovery. The computer browser service is a networking technology used by Windows-based computers to maintain updated lists of domains, workgroups, and the computers within them and to supply these lists to client computers upon request. Additionally or alternatively, network topology information can be collected as network information from active directory or from the network map feature available in Window-based computers. Additionally or alternatively, network topology information may be collected by a suitable tool using the Link Layer Discovery (LLTD) protocol and/or accessing the Management Information Base ("MIB") of network devices. A MIB is a virtual database used for managing the entities in a communications network. Most often associated with the Simple Network Management Protocol ("SNMP"), the term is also used more generically in contexts such as in OSI/ISO Network management model. While intended to refer to the complete collection of management information available on an entity, it is often used to refer to a particular subset, more correctly referred to as MIB-module. Objects in the MIB are defined using a subset of Abstract Syntax Notation One (ASN.1) called "Structure of Management Information Version 2 (SMIv2)" RFC 2578. The software that performs the parsing is a MIB compiler. The database is hierarchical (tree-structured) and each entry is addressed through an object identifier (OID). Internet documentation RFCs discuss MIBs, notably RFC 1155, "Structure and Identification of Management Information for TCP/IP based internets", and its two companions, RFC 1213, "Management Information Base for Network Management of TCP/IP-based internets", and RFC 1157, "A Simple Network Management Protocol".

The tagging module 212 parses and tags collected viewer information to facilitate subsequent information processing by the filtration module 216 and ratings service 144. Generally, a tag characterizes, summarizes, and/or refers to the type or content of information associated with the tag. Exemplary tags include a tag denoting a type of device associated with a tag, a tag denoting a type of information associated with the tag, such as a tag denoting Internet search performed by the viewer, a tag denoting an application accessed and/or loaded by the viewer, a tag denoting frequency of application access, a tag denoting content accessed and/or loaded by the viewer, a tag denoting a type of content accessed and/or loaded by the viewer, a tag denoting a visited Website, a tag denoting frequency of visited Web site access, a tag denoting a type of visited Website, a tag denoting name of viewer, a tag denoting viewer characteristic (e.g., which may be further differentiated by age, sex, ethnicity, etc.), a tag denoting physical location of household, a tag denoting viewer hobby, a tag denoting viewer interest, a tag denoting viewer employment status, a tag denoting type of viewer employment, a tag denoting socioeconomic status of a respective viewer and/or household, a tag summarizing content of the associated viewer information, and the like. Other types of tags may also be used. Tags are typically located in a string with the corresponding collected viewer information (tagged by the tag) and/or otherwise linked to the corresponding collected viewer information.

The filtration module 216 receives tagged collected timestamped viewer information from the tagging module 212 and applies one or more rule sets 220 to determine what information is permissible to send to the ratings service 144. The rule sets 220 can be any type of rule controlling and/or restricting behavior of any of the computational modules of FIG. 3. For example, rule sets 220 can define what types of timestamped viewer information (e.g., which tags) can be transmitted to a ratings service (due to privacy concerns, viewer imposed restriction, and/or lack of relevance), how to configure the screen 320 (e.g., the touch sensitive display 310 and/or configurable area 312) for an identified viewer, what information can be and/or cannot be collected by the viewer information collection module, how the provisioning module 228 will interact with the viewer and/or a content distributor 136, and how the enforcement module 232 will interact with the viewer to enforce contractual and other restrictions and requirements stipulated at the time of viewer purchase of the intelligent TV 100.

Figure 4:
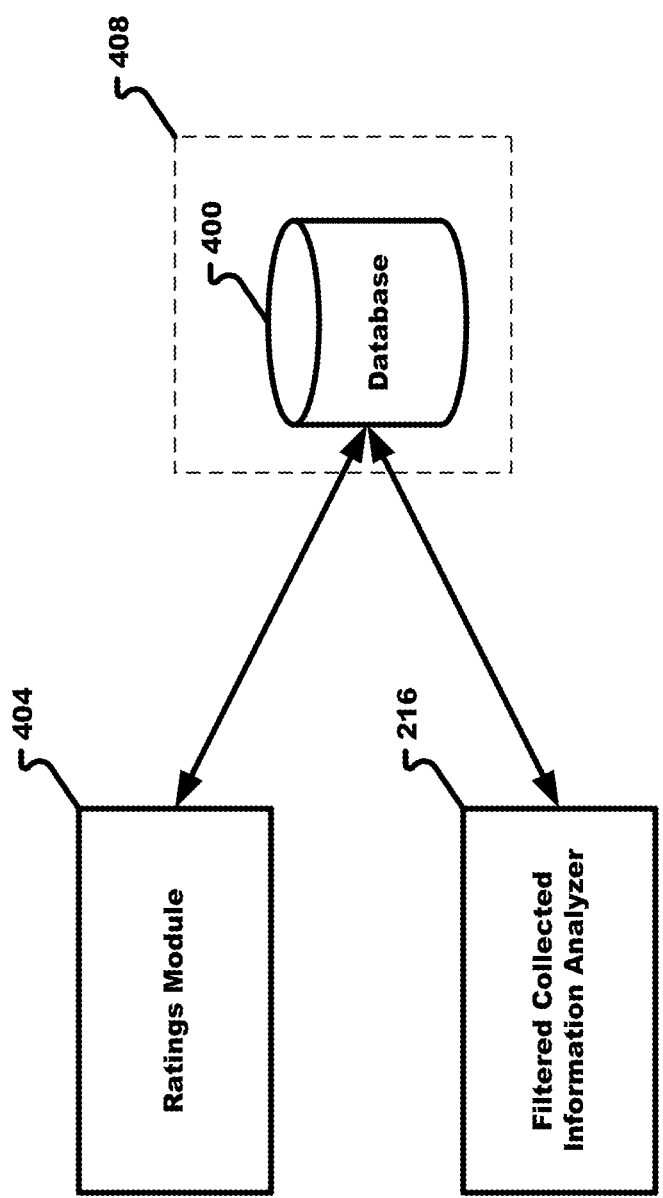
FIG. 4 is a block diagram of an embodiment of a system for interacting with the intelligent television.

As shown in FIG. 4, the filtration module 216 filters the filtered and tagged collected timestamped viewer information using the tags and transmits only permissible viewer information to the ratings service 144. The destination, or filtered viewer information recipient, can be one or more of the intelligent TV manufacturer or a ratings service, where the filtered viewer information is stored in a database 400.

A ratings module 404, using the filtered viewer information, determines selected ratings using conventional audience measurement algorithms. The viewer information that is filtered out by the filtration module 216 is typically erased from memory 308 and therefore discarded.

The configuration module 224 controls the configuration of the screen 320 (e.g., the touch sensitive display 310 and/or configurable area 312) for an identified viewer. The viewer is typically identified by the user ID module. The screen configuration refers to displayed configuration of graphical identifiers (e.g., identifying a corresponding software application, menu choice, content selection, station selection, media-type, feature setting, function, button, and the like) presented to the viewer, which buttons and/or icons are presented to the viewer, configuration of an on-screen directory containing programming and/or other content selectable by the viewer, and the like. For example, programming identifiers can be presented hierarchically from most frequently selected to less frequently selected by the identified viewer. In another example, a customized TV guide can be created for the identified viewer based on the viewer's preferences (e.g., all sports channels and/or programming listed first). Viewer preferences can be determined based on viewer input and/or observed viewing behavior of the identified viewer and/or other collected viewer information. The configuration module 224 can effect this, for example, by logging automatically into the identified viewer's Internet account and creating a TV guide customized for the viewer's preferences. The configuration module 224 can identify other viewers in proximity to the intelligent television and tailor the configuration of the screen to plural viewers. This may cause the standard, uncustomized or default, screen configuration to be presented notwithstanding viewer preferences or a modified or blended screen configuration reflecting the preferences and/or needs of the viewers. For instance, when the identified viewers include one or more children, parental controls may be automatically enforced by controlling or filtering one or more of the content selected for the customized TV guide or other displayed content or by disabling certain content from being selected by the viewer controlling the remote control. A tree-type menu structure can be reconfigured or customized by the viewer to add, remove, and/or restructure branches, nodes, and/or leaves. Thus, the customized menu structure is different from the default or standard menu structure. Such menu structures are common for negotiating among the programming and feature options selected by a viewer. Stated differently, for a given common intelligent TV operation a first viewer will have a first screen configuration and a second, different viewer will have a second screen configuration. Finally, when it is determined that the viewer has fallen asleep, the configuration module can power down the intelligent TV.

The provisioning module 228 contacts a content distributor and/or the manufacturer and/or vendor in the intelligent TV distribution chain to enable and/or configure the intelligent TV when installed. It can enforce, at the time of provisioning, contractual and other restrictions and requirements stipulated at the time of viewer purchase of the intelligent TV 100. Enforcement options include partially and/or completely disabling the intelligent TV until the contractual and other restrictions and requirements are satisfied. For example, the intelligent TV could have selected features and/or capabilities disabled while others are enabled until the restrictions and/or requirements are satisfied. The disabled features and/or capabilities could include a software functionality, a setting, access to a certain type of content, access to a certain content distributor, enhanced TV capabilities and/or features, high-definition TV capabilities and/or features, Internet TV capabilities and/or features, IPTV capabilities and/or features, smart TV capabilities and/or features, VOD capabilities and/or features, and/or Web TV capabilities and/or features. By way of illustration, one or more of the enhanced TV capabilities and/or features, high-definition TV capabilities and/or features, Internet TV capabilities and/or features, IPTV capabilities and/or features, smart TV capabilities and/or features, VOD capabilities and/or features, and Web TV capabilities and/or features can be disabled while the intelligent TV is enabled to operate as a substantially unintelligent standard-definition TV.

The enforcement module 232 performs the same enforcement function as the provisioning module 228 after initial provisioning is performed. As will be appreciated, a viewer can violate the restrictions and/or requirements after provisioning by altering settings on the intelligent TV 100 itself or a device 168 to prevent collection of viewer information.

The restrictions and/or requirements enforced by the provisioning and enforcement modules 228 and 232 are commonly agreed to by the viewer at the time of intelligent TV and/or software purchase. The software can, for example, provide enhanced functions, operations, and/or features for the intelligent TV and can be acquired from an online or Web accessible application store or Web site, from the intelligent TV manufacturer and/or a software vendor which has pre-installed the software in the intelligent TV, by purchasing a portable computer readable medium, such as a USB stick, and the like. These restrictions and/or requirements can be "purchased" by the intelligent TV manufacturer, software vendor, and/or ratings service by a subsidy, rebate, or discount on the intelligent TV and/or software purchase price in exchange for the viewer restrictions and/or requirements. The fact of "purchase" is recorded, along with the serial number of the intelligent TV and/or unique or substantially unique identifier software, software version and/or release date, and the identification information of the purchaser and vendor (e.g., retailer), in a manufacturer and/or vendor database. When the intelligent TV is provisioned or the software installed or unpackaged, the provisioning module 228 enforces the viewer restrictions and/or requirements as noted above. When obtained by the manufacturer and/or vendor, the viewer restrictions and/or requirements can subsequently be sold to one or more ratings services 144. The restrictions and/or requirements are typically permissions to enable viewer information to be collected not only from the intelligent TV but also from one or more other devices in the local area network of the viewer's household. The permissions can be enforced by requiring the viewer, at the time of provisioning, to provide to the intelligent TV, via a graphical user interface, permission to collect the information from the intelligent TV and other devices and the credentials necessary to contact the other devices to collect the viewer information. When credentials are changed and access is no longer possible, a viewer violation of the restrictions and/or requirements is identified by the enforcement module 232 and appropriate actions taken.

The collected viewer information can also be sold to businesses and/or content distributors for use in targeted advertising. In other words, the collected viewer information can be used to develop profiles or households, individual, and/or families and, based on the profiles, provide customized advertising to viewers, thereby increasing the success of advertisers. Such viewer information can enable party-specific, or targeted, advertising and other information to be pushed over the intelligent TV and/or other communication device to each home rather than having common advertising and/or other information broadcast simultaneously to all homes. In other words, within a given geographical region or station broadcast area or set of viewers different viewers of the same programming content or programming content provided by a common content distributor would receive customized or tailored advertising content based on monitored user characteristics/behavior/collected information. Within a common household, the content presented by the intelligent TV can be varied based on the particular viewers determined to be watching concurrently the intelligent TV. For example, a wife watching the intelligent TV alone could receive different content compared to the husband watching the intelligent TV alone. When the husband and wife are watching the intelligent TV together, yet different content can be provided compared to both of the prior examples. This concept can be expanded to computers generally when video programming is being viewed and/or when electronic media and/or multimedia messages are being sent to viewer/user communication devices, such as by instant messaging, email, voice calls, and the like. It can also be used to effect targeted advertising mailings to individuals and/or households. The browsing history of the user could be used to push or pull customized advertising content to the user. For example if the collected viewer information indicated that the viewer surfed fitness web sites, or all of the occupants of the selected household are thin and muscular, the intelligent TV may present the viewer(s) with fitness-related advertisements, such as advertising by local gyms, workout equipment manufacturers or vendors, sports clothing or wear manufacturers and/or retailers, and the like.

The collected viewer information can also include product tags or identifiers within the household. Tags, such as radio frequency identification tags, bar codes, and the like associated with objects in the household or within a selected area or range of the intelligent TV can be captured by a sensor or reader in the intelligent TV and/or in wired and/or wireless communication with the intelligent TV. The sensed object tags can be used for targeted advertising. For example, if the viewer were to read People™ magazine while watching the intelligent TV, he or she may be interested that TMZ™ is on a different channel. If a viewer were to be drinking Pepsi while watching the intelligent TV, Coca Cola™ may want to try to show them Coke™ advertising.

Figure 5:
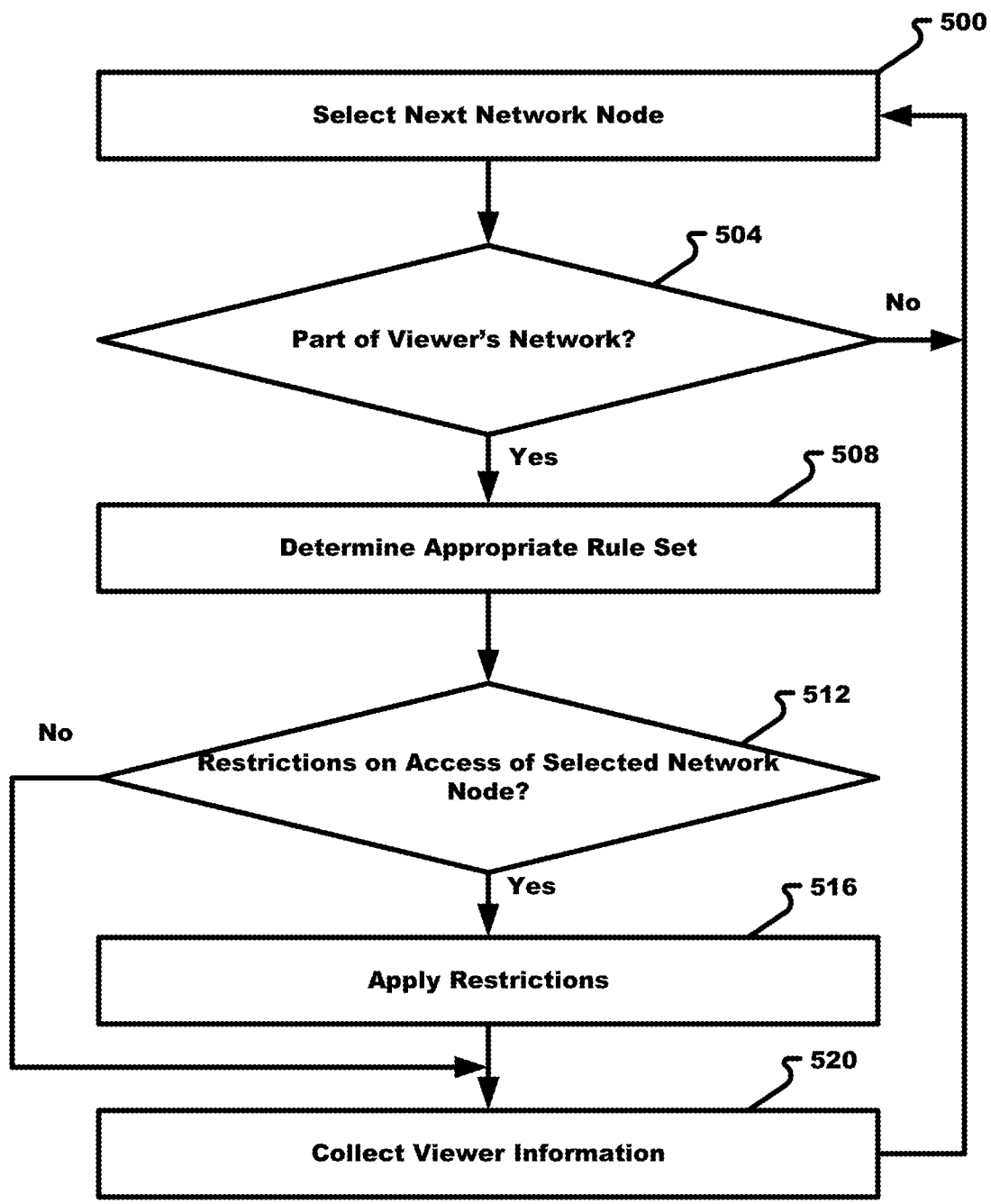
FIG. 5 is a flow diagram of logic in an embodiment of the intelligent television software and/or firmware.

Operation:

With reference to FIG. 5, the viewer information collection module 204 selects a next network node in the viewer's local area network (step 500). The network node can be not only the intelligent TV 100 itself but also any other device 168.

In decision diamond 504, the viewer information collection module 204 determines whether the selected network node is part of the viewer's local network. This can be done, for example, by attempting unsuccessfully to use the viewer supplied credentials to access the selected network node. This can also be done by using the estimated physical location of the selected network node to determine whether or not it is within or outside of the viewer's home. In this variation, when the range to the selected network node is more than a selected distance or signal strength (or signal/noise ratio) of a responsive signal from the selected network node is less than a selected level the viewer information collection module 204 determines that the selected network node is not part of the viewer's network and returns to and repeats step 500 for a next selected network node. When the selected network node is determined to be within the viewer's home but cannot be accessed by the viewer provided credentials, the viewer information collection module 204 reports the failure instance as a potential violation of a viewer restriction and/or requirement.

When the selected network node is part of the viewer's network, the viewer information collection module 204, in step 508, determines an appropriate rule set 220 to govern the interaction with the selected network node. The rule set 220 may vary depending on the type of device at the selected network node and/or whether the selected network node is the intelligent TV 100 or another device 168. Different devices, for example, can have differing levels of permission or privilege accorded to the viewer information collection module 204 to collect viewer information.

In step 512, the viewer information collection module 204 determines whether or not there are restrictions on access of the selected network node. When the applicable rule set restricts what or the amount of viewer information that can be accessed and collected, the viewer information collection module 204, in step 516, applies the restrictions in the rule set to the viewer information that is collected. When the applicable rule set does not restrict what or the amount of viewer information that can be accessed and collected, the viewer information collection module 204, in step 520, collects the predetermined types of viewer information from the selected network node.

The viewer information collection module 204 then returns to and repeats step 500 with respect to a next selected network node.

Figure 8:
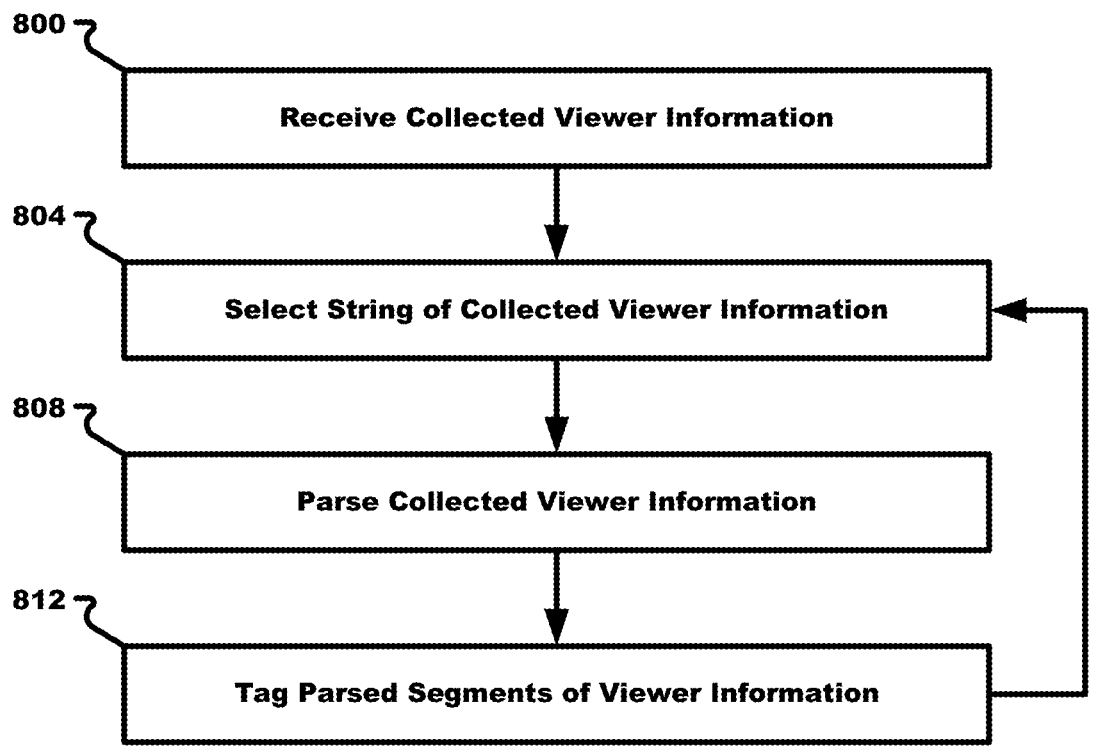
FIG. 8 is a flow diagram of logic in an embodiment of the intelligent television software and/or firmware.

Referring to FIG. 8, the tagging module 212 receives the collected viewer information (step 800), selects an item, or string, of received and collected viewer information (step 804) for processing, parses the selected string of received and collected viewer information (step 808), and tags the parsed segments of the received and collected viewer information (step 812). The tagging module 212 then returns to and repeats step 804 with respect to a next selected item of received and collected viewer information.

Figure 9:
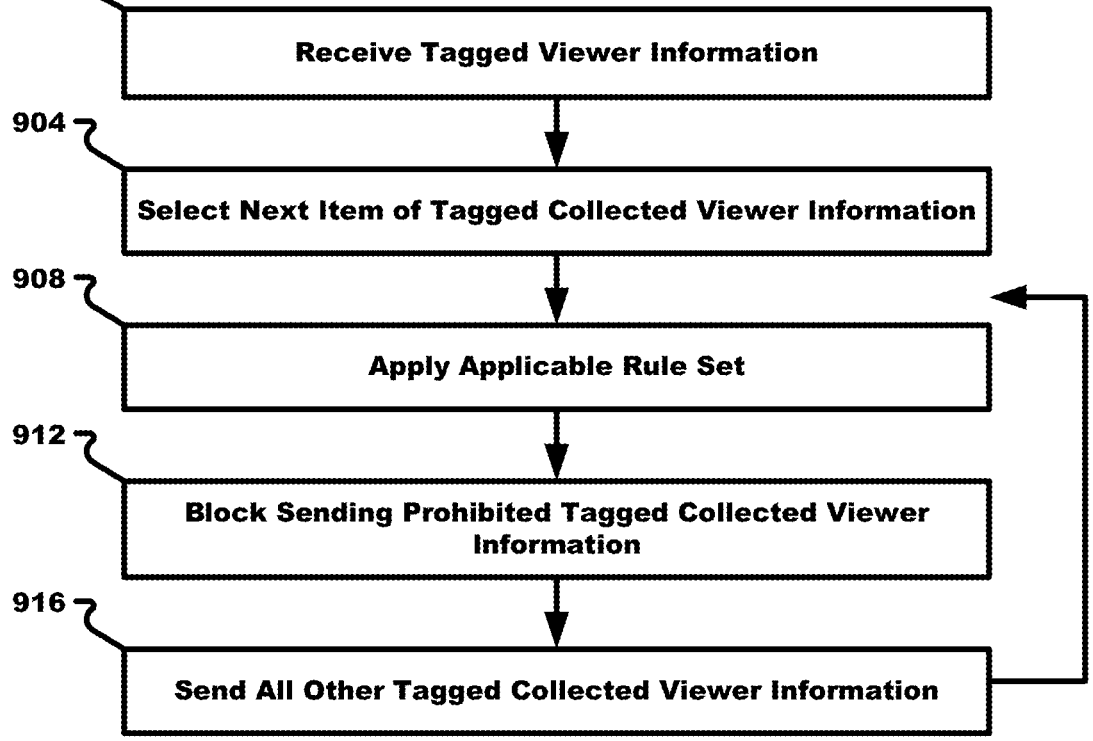
FIG. 9 is a flow diagram of logic in an embodiment of the intelligent television software and/or firmware.

Referring to FIG. 9, the filtration module 218 receives tagged collected viewer information (step 900), selects an item of tagged collected viewer information for transmission (step 904), applies an applicable rule set 220 to determine if transmission is permitted (step 908), blocks sending the selected item when prohibited (step 912), and sends the item when not prohibited (step 916). The filtration module 218 then returns to and repeats step 904 with respect to a next selected item of received and collected viewer information.

Figures 10, 11:
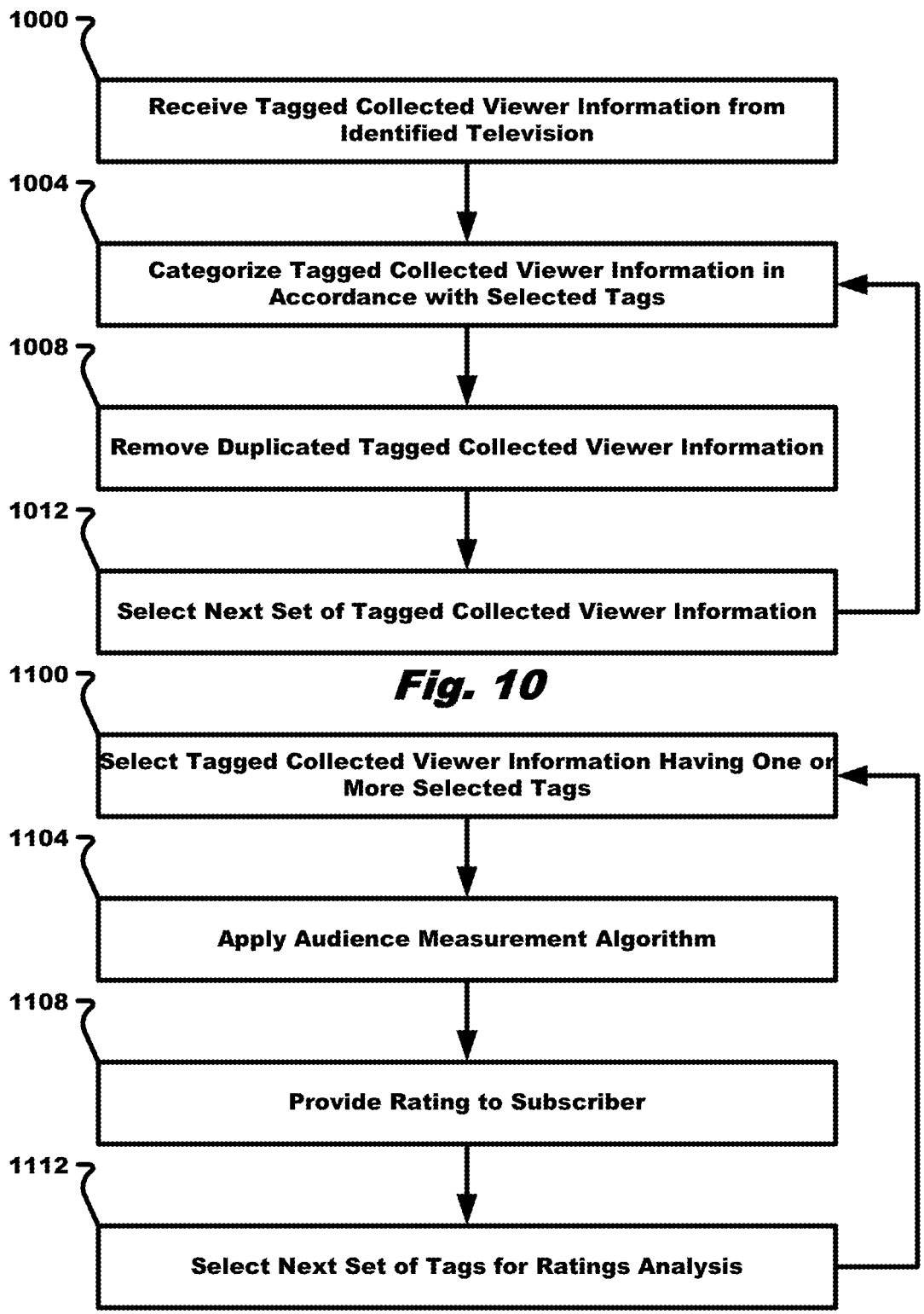
FIG. 10 is a flow diagram of logic in an embodiment a system for interacting with the intelligent TV.
FIG. 11 is a flow diagram of ratings logic in an embodiment of the system.

Referring to FIG. 10, an input at the destination node 408, whether a manufacturer, ratings service, and/or content distributor, receives the tagged collected viewer information from an identified intelligent television 100.

In step 1004, a microprocessor (such as a database management system), in communication with the input, categorizes, or organizes in a database, the tagged collected viewer information in accordance with the one or more selected tags. Depending on the recipient, only certain tags may be relevant or of interest. These tags can be identified from among all of the tagged information, and the database 400 updated accordingly. Like tags and/or similar content can be grouped or linked together. For example, all tagged items of tagged collected viewer information relating to watching a selected sporting event can be grouped together. Thus, all modalities of viewing of the selected sporting event, whether by way of an intelligent TV 100 or other device 168, can be identified.

In step 1008, the microprocessor optionally removes duplicated items of tagged collected viewer information. For example, if a common household watched the selected sporting event on both the intelligent TV 100 and other device 168, the microprocessor would treat these events as duplicates and remove one from the stored record of the common household. This avoids ratings inflation by the same viewer accessing selected content by multiple different channels, content distributors, and/or devices.

The microprocessor, in step 1012, selects a next item of tagged collected viewer information and returns to step 1004.

Referring to FIG. 11, the ratings module 404, in step 1100, selects items of tagged collected viewer information previously processed as set forth in FIG. 10 and having one or more selected tags (step 1100), applies an audience measurement algorithm (step 1104) based on the selected items, determines and provides a rating to a rating service 144 and/or a rating service subscriber (step 1108), and selects a next set of tags for ratings analysis (step 1112).

Figure 6:
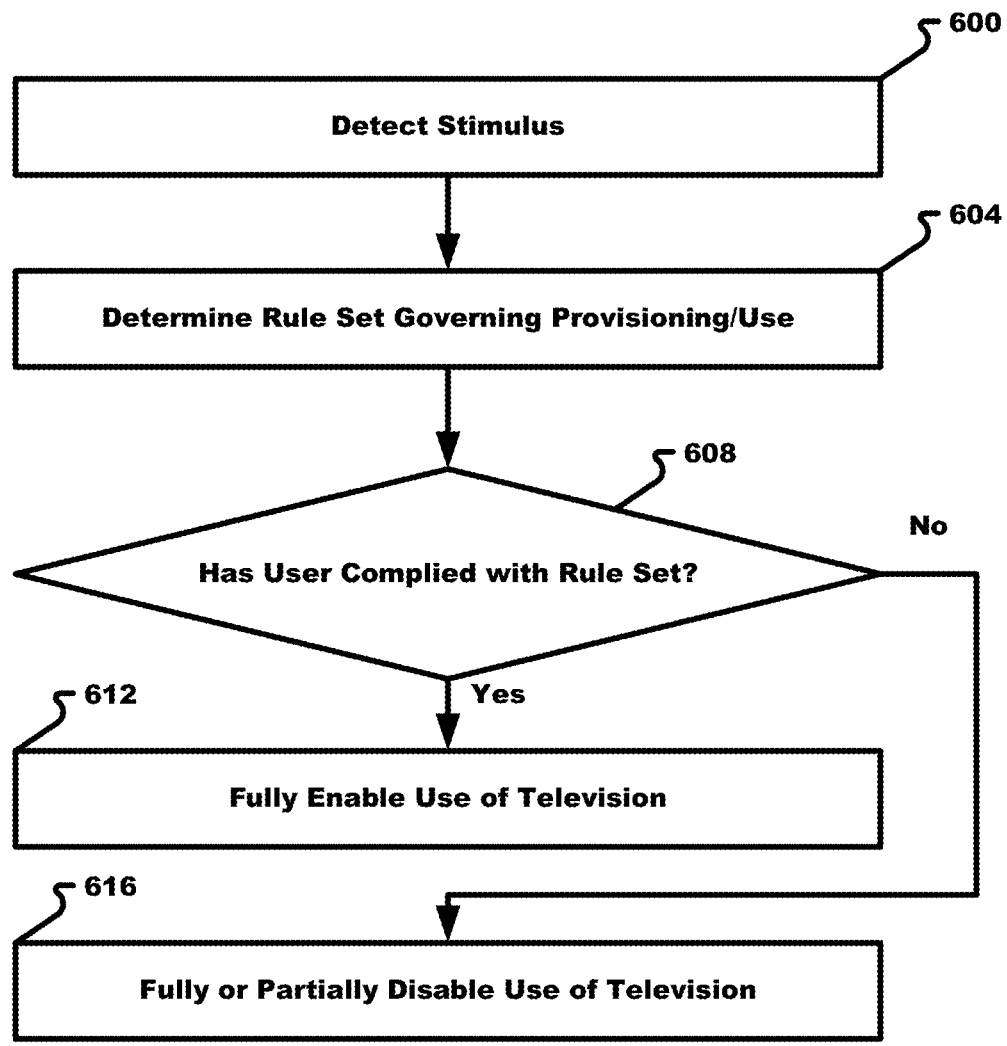
FIG. 6 is a flow diagram of logic in an embodiment of the intelligent television software and/or firmware.

Referring to FIG. 6, the provisioning module 228 or enforcement module 232, as appropriate, detects a stimulus (step 600). The stimulus can be a provisioning request by a viewer (for the provisioning module), a selected node access error (particularly for a previously accessible device 168 (for the enforcement module), an attempt by a viewer to remove or revoke a permission to access viewer information as required by a requirement and/or restriction), and the like.

In step 604, the module (whether the provisioning module 228 or enforcement module 232) determines an applicable rule set governing the provisioning and/or use of the intelligent TV 100.

In decision diamond 608, the module (whether the provisioning module 228 or enforcement module 232) determines whether the user/viewer has complied fully with the applicable rule set.

When the user/viewer has complied fully, the module (whether the provisioning module 228 or enforcement module 232) fully enables use of the intelligent television 100 (step 612).

When the user/viewer has not complied fully, the module (whether the provisioning module 228 or enforcement module 232) fully or partially disables use of the intelligent television 100 (step 616).

Figure 7:
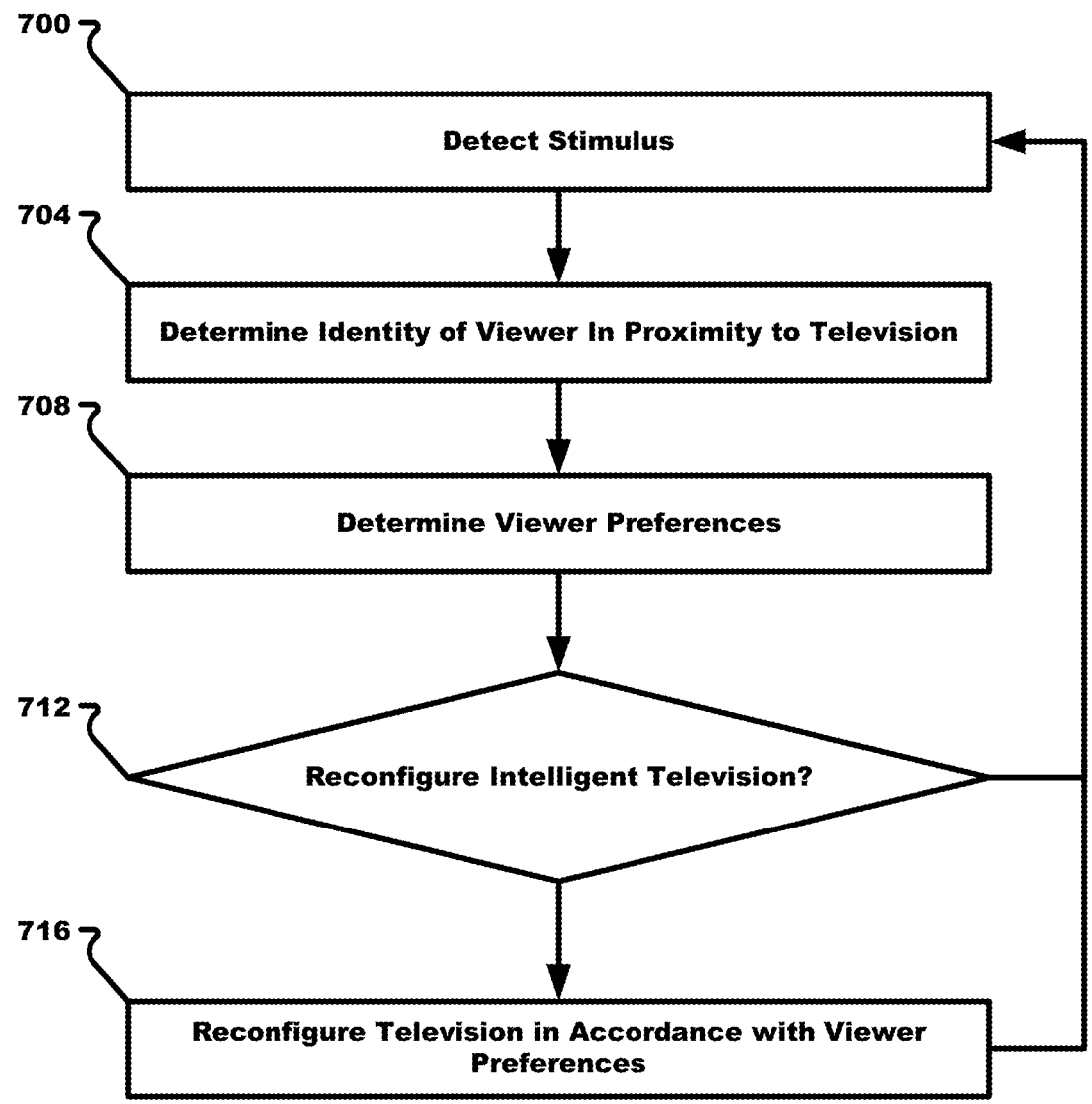
FIG. 7 is a flow diagram of logic in an embodiment of the intelligent television software and/or firmware.

Referring to FIG. 7, the configuration module 224, in step 700, detects a stimulus. The stimulus can be, for example, receipt of viewer identification information, directly from the viewer or indirectly from the user ID module 350, determination that a portable device associated with a viewer and in wireless communication with the local area network 124 and/or wireless LAN 128 is in spatial proximity (e.g., within a determined range of the intelligent television and/or within a specified spatial area) (which can be determined by signal strength and/or signal:noise ratio of a received signal from the portable device and/or from a satellite positioning system receiver in the portable device), and determination that a portable device for controlling one or more intelligent TV operations and that is associated with a specified viewer is attempting to control an intelligent TV operation.

In step 704, the configuration module 224 determines the identity of the viewer in proximity to the intelligent television.

In step 708, the configuration module 224 determines the viewer preferences associated with the identified viewer. The viewer preferences may be in the form of a user-inputted rule set 220.

In decision diamond 712, the configuration module 224 determines whether the intelligent television settings, content, or other menu or display parameter needs to be reconfigured.

If reconfiguration is not required, such as because there is no applicable rule set or other set of preferences for the identified viewer or because the intelligent TV is already configured for the preferences of the identified viewer, the configuration module 224 returns to step 700.

If reconfiguration is required, the configuration module 224, in step 716, reconfigures the intelligent TV in accordance with viewer preferences.

The configuration module 224 thereafter returns to step 700 and awaits a next stimulus.

The exemplary systems and methods of this disclosure have been described in relation to intelligent TV-enabled networks. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as an intelligent television, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, a set-top box or set meter is used to perform some or all of the above-described functions of the intelligent TV 100.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   detecting, by an intelligent television, a first stimulus from a user ID module;
   based on the first stimulus, automatically determining, by a microprocessor executable configuration module associated with the intelligent television, a first identity of a first viewer;
   determining, by the microprocessor executable configuration module, automatically based on the first identity of the first viewer, a first display configuration of an on-screen directory, the first display configuration defining a plurality of graphical identifiers, each graphical identifier of the plurality of graphical identifiers comprising a menu choice of a plurality of menu choices, the plurality of menu choices arranged in a tree-type menu structure defined by the first viewer;

detecting, by the intelligent television, a second stimulus from the user ID module;

based on the second stimulus, automatically determining, by the microprocessor executable configuration module associated with the intelligent television, a second identity of a second viewer;

determining, by the microprocessor executable configuration module, automatically based on the second identity of the second viewer, a second display configuration of the on-screen directory, the second display configuration defining a plurality of graphical identifiers, each graphical identifier of the plurality of graphical identifiers comprising a menu choice of a plurality of menu choices, the plurality of menu choices arranged in a tree-type menu structure defined by the second viewer and wherein the second display configuration is different from the first display configuration;

determining, by the microprocessor executable configuration module, a blended display configuration of the on-screen directory based on the first display configuration and the second display configuration, wherein a menu structure of the blended display configuration is different from the menu structure of the first display configuration and the menu structure of the second display configuration; and presenting, by the microprocessor executable configuration module, the on-screen directory based on the blended display configuration.

2. The method of claim 1, wherein the microprocessor executable configuration module determines the first identity of the first viewer based on one or more of receipt of identification information from the first viewer, from an image of the first viewer, from a voice of the first viewer, from a retina of the first viewer, from a finger print of the first viewer, and an identity of a computational device used to control one or more intelligent television features and/or operations.

3. The method of claim 2, further comprising determining that a portable device associated with the first viewer is in spatial proximity of the intelligent television.

4. The method of claim 3, wherein spatial proximity is determined by signal strength received at the intelligent television.

5. The method of claim 3, wherein spatial proximity is determined by a signal to noise ratio at the intelligent television.

6. The method of claim 3, wherein spatial proximity is determined by a GPS receiver at the portable device.

7. The method of claim 3, wherein the portable device controls functions of the intelligent television.

8. The method of claim 3, wherein the intelligent television determines that the portable device is associated with the first viewer.

9. The method of claim 3, further comprising, based on information about the portable device, identifying the first viewer.

10. The method of claim 3, based on determining whether to provide the second display configuration, providing the second display configuration.

11. The method of claim 10, further comprising, determining whether to provide the second display configuration, maintaining the first display configuration.

12. The method of claim 10, further comprising: awaiting a next stimulus.

13. The method of claim 10, wherein the second display configuration need not be provided if the same as the first display configuration.

14. The method of claim 10, wherein the first display configuration does not need to be reconfigured if a second display configuration has yet to be associated with the second viewer.

15. The method of claim 2, wherein the user ID module receives an image of the first viewer from an image capture device associated with the intelligent television to identify the first viewer without input from the first viewer.

16. The method of claim 2, further comprising: receiving an input from the first viewer; and based on the input, modifying the first display configuration, associated with the first viewer, by changing one or more graphical identifiers presented to the first viewer.

17. The method of claim 2, wherein the first display configuration is part of a user-inputted rule set.

18. An intelligent television comprising:
a screen to present content to a first viewer and/or a second viewer;
a memory to store instructions and a configuration;
a processor in communication with the screen and the memory, the processor to:
detect a first stimulus from a user ID module;
detect a second stimulus from the user ID module;
execute a configuration module that:
based on the first stimulus, automatically determines a first identity of the first viewer; and
automatically determines, based on the first identity of the first viewer, a first display configuration of an on-screen directory, the first display configuration defining a plurality of graphical identifiers, each graphical identifier of the plurality of graphical identifiers comprising a menu choice of a plurality of menu choices, the plurality of menu choices arranged in a tree-type menu structure defined by the first viewer;
based on the second stimulus, automatically determines a second identity of the second viewer;
determines, based on the second identity of the second viewer, a second display configuration of the on-screen directory, the second display configuration defining a plurality of graphical identifiers, each graphical identifier of the plurality of graphical identifiers comprising a menu choice of a plurality of menu choices, the plurality of menu choices arranged in a tree-type menu structure defined by the second viewer and wherein the second display configuration is different from the first display configuration;
determines a blended display configuration of the on-screen directory based on the first display configuration and the second display configuration, wherein a menu structure of the blended display configuration is different from the menu structure of the first display configuration and the menu structure of the second display configuration; and
presents the on-screen directory based on the blended display configuration.

19. A tangible and non-transient computer readable medium comprising microprocessor instructions that, when executed by a microprocessor, cause the microprocessor to:
detect a first stimulus from a user ID module;
execute a configuration module, wherein the configuration module:
based on the first stimulus, automatically determine a first identity of a first viewer; and automatically determines, based on the first identity of the first viewer, a first display configuration of an on-screen directory, the first display configuration defining a plurality of graphical identifiers, each graphical identifier of the plurality of graphical identifiers comprising a menu choice of a plurality of menu choices, the plurality of menu choices arranged in a tree-type menu structure defined by the first viewer;

based on a second stimulus, automatically determines a second identity of a second viewer;

determines, based on the second identity of the second viewer, a second display configuration of the on-screen directory, the second display configuration defining a plurality of graphical identifiers, each graphical identifier of the plurality of graphical identifiers comprising a menu choice of a plurality of menu choices, the plurality of menu choices arranged in a tree-type menu structure defined by the second viewer and wherein the second display configuration is different from the first display configuration;

determines a blended display configuration of the on-screen directory based on the first display configuration and the second display configuration, wherein a menu structure of the blended display configuration is different from the menu structure of the first display configuration and the menu structure of the second display configuration; and present the on-screen directory based on the blended display configuration.

\* \* \* \* \*

UNITED STATES PATENT AND TRADEMARK OFFICE
CERTIFICATE OF CORRECTION

PATENT NO. : 10,958,956 B2  
APPLICATION NO. : 16/564397  
DATED : March 23, 2021  
INVENTOR(S) : Christopher P. Ricci Page 1 of 1

It is certified that error appears in the above-identified patent and that said Letters Patent is hereby corrected as shown below:

In the Claims

Claim 19, Column 28, Line 66, replace "determine" with --determines-- therein.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*